US008370895B2

(12) United States Patent
DiCrescenzo et al.

(10) Patent No.: US 8,370,895 B2
(45) Date of Patent: Feb. 5, 2013

(54) SOCIAL NETWORK PRIVACY BY MEANS OF EVOLVING ACCESS CONTROL

(75) Inventors: Giovanni DiCrescenzo, Madison, NJ (US); Richard J. Lipton, Atlanta, GA (US)

(73) Assignee: Telcordia Technologies, Inc., Piscataway, NJ (US)

( * ) Notice: Subject to any disclaimer, the term of this patent is extended or adjusted under 35 U.S.C. 154(b) by 147 days.

(21) Appl. No.: 12/855,333

(22) Filed: Aug. 12, 2010

(65) Prior Publication Data

US 2011/0197255 A1   Aug. 11, 2011

Related U.S. Application Data

(60) Provisional application No. 61/233,320, filed on Aug. 12, 2009.

(51) Int. Cl.
*G06F 17/00* (2006.01)
(52) U.S. Cl. .......................................................... 726/1
(58) Field of Classification Search .................. 726/1, 2, 726/26
See application file for complete search history.

(56) References Cited

U.S. PATENT DOCUMENTS

| 2005/0197922 | A1* | 9/2005 | Pezaris et al. .................... 705/27 |
| 2006/0042483 | A1 | 3/2006 | Work et al. |
| 2007/0112574 | A1 | 5/2007 | Greene |
| 2008/0070593 | A1 | 3/2008 | Altman et al. |
| 2008/0077517 | A1 | 3/2008 | Sappington |
| 2008/0133716 | A1 | 6/2008 | Rao et al. |
| 2009/0192860 | A1 | 7/2009 | Heller et al. |
| 2010/0042690 | A1* | 2/2010 | Wall ................................ 709/206 |

OTHER PUBLICATIONS

Lugano, Giuseppe et al., "To Share or not to Share: Supporting the User Decision in Mobile Social Software Applications," In Proceedings of the 11th International Conference on User Modeling, pp. 440-444, 2007.
Lugano, Giuseppe et al., CITATION depicting publication date for the article "To Share or not to Share: Supporting the User Decision in Mobile Social Software Applications," In Proceedings of the 11th International Conference on User Modeling, pp. 440-444, 2007.
Patent Cooperation Treaty International Search Report, Sep. 30, 2010.

* cited by examiner

*Primary Examiner* — Ellen Tran
(74) *Attorney, Agent, or Firm* — Philip J. Feig

(57) ABSTRACT

A method and software product for limit privacy loss due to data shared in a social network, where the basic underlying assumptions are that users are interested in sharing data and cannot be assumed to constantly follow appropriate privacy policies. Social networks deploy an additional layer of server-assisted access control which, even under no action from a user, automatically evolves over time, by restricting access to the user's data. The evolving access control mechanism provides non-trivial quantifiable guarantees for formally specified requirements of utility (i.e., users share as much data as possible to all other users) and privacy (i.e., users expose combinations of sensitive data only with low probability and over a long time).

15 Claims, 3 Drawing Sheets

SOCIAL NETWORK PRIVACY BY MEANS OF EVOLVING ACCESS CONTROL

CROSS-REFERENCE TO RELATED APPLICATIONS

This application claims the benefit of U.S. Provisional Application No. 61/233,320, filed on Aug. 12, 2009, which is incorporated by reference herein in its entirety.

FIELD OF THE INVENTION

The present invention relates to limiting privacy loss due to data shared in a social network.

BACKGROUND OF THE INVENTION

Recent trends in social networks include the rise of businesses that manage social networking websites (e.g., Facebook, MySpace, Twitter) where users can freely post their data (images, text, files, etc.) and share it with their friends, peers, or anyone else having access to the website. As the most popular sites are currently attracting tens of millions of users, consequences of site misuses are being documented on a daily basis in major newspapers and media entities. One typical class of misuse is that users happen to share various types of sensitive data (e.g., embarrassing images, politically incorrect opinions, proprietary files, etc.), which trigger undesired consequences (e.g., impacting decisions with respect to job hiring and firing, provision of medical or other types of insurance, etc.).

Balancing the users' desire of sharing their data (referred to as "utility") with the users' needs to keep data private against future undesired consequences (referred to as "privacy") is recognized as a big problem in practical social networks.

Theoretically, users could maintain privacy at the expense of utility (i.e., by sharing no data), or could maximize utility at the expense of privacy (i.e., by not restricting access to all shared data), or, perhaps the best theoretical compromise, could balance utility and privacy by constantly implementing an access control policy which provides the desired data privacy at current and future times. The latter approach, if possible at all, is expected to be impractical for at least two reasons: drafting a policy that is guaranteed to keep privacy in the future may be hard in many scenarios (i.e., data seeming innocent today may not be so tomorrow) and requiring users of a huge social network to perfectly comply to a probably complex privacy policy may have little success in many scenarios, possibly going against the social network's goals. In fact, even in the case of a perfectly complying single user, this user's privacy can be compromised by other users' behavior. Overall, this implies that user-regulated access control alone may not be an acceptable privacy solution.

Recently there have been general discussions of trust and privacy problems with the use of social networks. Moreover, public press is devoting daily attention to these problems, typically writing about undesired events resulting from weak privacy, but occasionally also writing about quick and practical "common sense" ways to limit privacy loss. A few research papers have recently attempted solutions to different privacy problems in social networks. For instance, privacy-preserving criminal investigations were studied in Kerschbaum, F. and Schaad, A. Privacy-preserving social network analysis for criminal investigations, In Proc. of the 7th ACM Workshop on Privacy in the Electronic Society. WPES '08. ACM, New York, N.Y., 9-14; privacy characterizations were studied in Krishnamurthy, B. and Wills, C. Characterizing Privacy in Online Social Networks. In Proc. of ACM WOSN 2008; privacy in graph-based models were studied in Korolova, A., Motwani, R., Nabar, S. U., and Xu, Y. 2008, Link privacy in social networks. In Proceeding of the 17th ACM Conference on Information and Knowledge Management. CIKM '08. ACM, New York, N.Y., 289-298; and a game theory mechanism that promotes truthfulness while sharing data was proposed in Squicciarini, A. C., Shehab, M., and Paci, F. 2009. Collective privacy management in social networks. In Proceedings of the 18th international Conference on World Wide Web. WWW '09. ACM, New York, N.Y., 521-530.

SUMMARY OF THE INVENTION

The present invention provides a methodology and a software product to counteract privacy loss due to sharing data in social networking websites. Specifically, in addition to the above "user-regulated" access control, users of a social network are provided an additional layer of "server-assisted" access control which automatically evolves over time, by intelligently restricting access to some of the user's data, and provides non-trivial quantifiable guarantees for utility and privacy. The access control specifically targets the two mentioned drawbacks of users-regulated access control by providing probabilistic guarantees about privacy and by not requiring any additional action from the user (thus simultaneously avoiding nuisance to the user as well as damage accidentally created by the same user). That is, the present model represents a user's shared database as a collection of data objects with an attribute that can be set to private (when shared only among a restricted set of social network users) or public (when shared among all users) at any one out of a sequence of time periods. In this model, the proposed server-assisted access control paradigm automatically updates the access control policy at each time period, by randomly resetting some of the user's data objects as public or private, possibly depending on past and future attribute settings. In other words, this mechanism, which is referred to as "evolving access control", specifies how data object privacy attributes are set in the time periods when the user is either inactive or unwilling to deal with the privacy problem. The attributes are not mandated to the user (i.e., a user can turn off this mechanism and implement his/her favorite privacy and/or access control policy) and, when set by the server, quantifiably guarantee formally specified requirements about utility (i.e., users leave as much data as possible with the attribute set to public) and privacy (i.e., users keep combinations of sensitive data with the attribute set to private with high probability).

For concreteness, sensitive data is modeled as an arbitrary subset of the user's data objects, which is unknown to the server and, for greater generality, also unknown to the user.

This methodology is probabilistic and based on variants of cover-free families. In the example, first it is observed that conventional cover-free families do not suffice for the goals (for instance, they do not necessarily maximize utility requirements); and then it is proposed a variation of a known construction for randomized subset selection (the latter being also analyzed as a cover-free family with certain properties) for which it can be proven that there are non-trivial and quantifiable utility and privacy properties.

The present invention will be more clearly understood when the following description is read in conjunction with the accompanying drawings.

DETAILED DESCRIPTION

Figure 1:
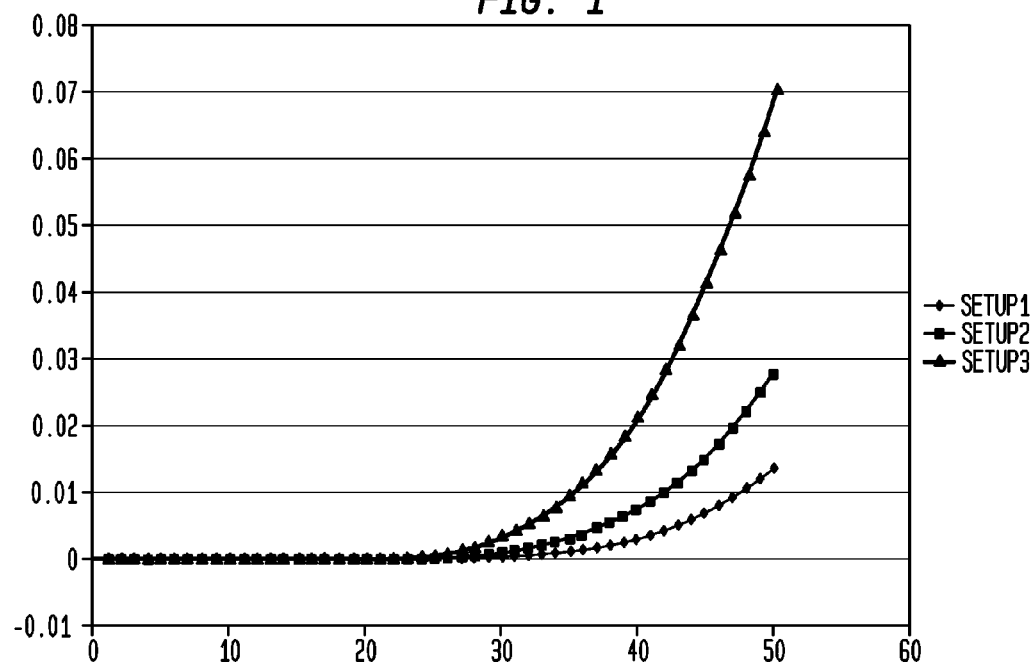
FIG. 1 is a graphical representation of the value of $\epsilon$ as a function of l when n=500, t=m=10, s=10 (setup 1); n=400, t=m=9, s=10 (setup 2), n=300, t=m=8, s=10 (setup 3). The max values of l such that $\epsilon<0.001$ are 47, 41, and 35, respectively.

Social networks allow their users different data formats and different sharing and access policies, possibly depending on the data types. With the following formalism we attempt to capture a simplified yet general model so to later facilitate an easier description and a wider applicability of the present invention. Consider a server S, running centralized software for the social network, and a user U that is one of the many members of the network. Let $D_1, \ldots, D_n \in \mathcal{D}$ be U's data objects (these may be images, text or computer files or the like), where $\{D_1, \ldots, D_n\}$ is referred to as the user database, and $\mathcal{D}$ is the data object space. An attribute function maps each data object to a privacy state; formally, define A: $\mathcal{D} \to \{\text{public; private}\}$, and denote as $b_1, \ldots, b_n \in \{\text{public, private}\}$ the values such that $b_j=A(D_j)$, for $j=1, \ldots, n$. Here, by k=public (resp., $b_j$=private) we mean that data object $D_j$ is shared with all (resp., only a restricted set of) social network users, where the restricted set is chosen by U.

The utility obtained by U in the participation to a social network, may depend on U's specific personality and interests. In agreement with the underlying philosophy of many real-life social networks, assume that setting $b_j$=public provides a higher utility, from U's point of view, than setting $b_j$=private. Thus, consider maximizing the number of j's from $\{1, \ldots, n\}$ such that $b_j$=public as a way to maximize U's utility in the participation to the social network.

Often the case that a single data object may not be sufficient source of sensitive material, while multiple data objects, when correlated, may be considered so. Attempting a reasonably simple and general model for sensitive data, assume that the conjunction of a number s of data objects may at some time become of sensitive nature. Thus, denote a sensitive subset as $P \subseteq \{1, \ldots, n\}$, $|P|=s$, with the understanding that U's privacy can be maintained if at least one of the s data objects $\{D_j | j \in P\}$ satisfies $A(D_j)$=private.

Define an access control algorithm as a probabilistic algorithm AC that, on input $D_1, \ldots, D_n \in \mathcal{D}$ and time subinterval i, returns values $b_1, \ldots, b_n$, such that $b_j=A(D_j) \in \{\text{public; private}\}$, for $j=1, \ldots, n$, and during time subinterval i. Note that by consistently applying an access control algorithm at each time subinterval so that at least one data object in the sensitive subset has attribute private, user U would solve the privacy problem. However, as already partially discussed above, assume that U may either not know which subset of data objects will be sensitive in the future, or may be unavailable to apply the access control algorithm, whenever needed. Consistently with practical access control systems (e.g., occasional password resets) assume that U is available to apply the access control algorithm at distant times 0 and T. Thus, consider a sufficiently large time interval, represented as [0, T], and further divide it into m equal-length subintervals. Augment the above notations of bj; A(Dj) so to incorporate time dependency: specifically, $b_{i,j}=A(I, D_j)$ denotes the attribute value of data object $D_j$ at the i-th subinterval of [0, T], for $i=1, \ldots, m$ and $j=1, \ldots, n$. Moreover, it is assumed that at data object submission time it holds that $b_{0,j}=A(0, D_j)$=public for all $j=1, \ldots n$. Then define an evolving access control algorithm as a probabilistic algorithm EvAC that, on input $D_1, \ldots, D_n \in \mathcal{D}$ and parameter m, returns values $b_{i,1}, \ldots, b_{i,n}$, such that $b_{i,j}=A(i,D_j) \in \{\text{public; private}\}$, for $i=1, \ldots, m$, and $j=1, \ldots, n$. The goal of the invention is that of designing evolving access control algorithms with utility and privacy properties.

As described above in the case of user databases, the notion of utility is subjective to the user U and thus, even in the case of access control algorithms, one could define utility of such algorithms in terms of a general function $f$ of $b_{i,1}, \ldots, b_{i,n}$, for $i=1, \ldots, m$, and $j=1, \ldots, n$. Formally, for any function $f: \{0, 1\}^{m \times n} \to [0, 1]$, the evolving access control algorithm EvAC has $f$-utility y if $f(\{b_{i,1}, \ldots, b_{i,n}\}^m_{i=1})=y$, where $\{b_{i,1}, \ldots, b_{i,n}\}^m_{i=1}=\text{EvAC}(D_1, \ldots, D_n, m)$. $f$ is the utility function for evolving access control algorithm EvAC (meaning that EvAC can be designed so to optimize $f$).

Define a more specific utility function $f$ that attempts to capture utility for as many social network users as possible. We extend the reasoning done for the case of user databases (i.e., utility increases when so does the number of data values that are publicly accessible) both across the number of documents on a given time subinterval (meaning that utility is higher when at any given time the attribute of a higher number of data values is set to public) and across the number of time subintervals for a given document (meaning that utility is higher when the attribute of any given document is set to public during a higher number of time subintervals).

First define notations $b_i=(b_{i,1}, \ldots, b_{i,n})$ and $b_j=(b_{i,j}, \ldots, b_{m,j})$, and then their respective Hamming weights $w(b_i)=\Sigma_{j=1}^n b_{i,j}$ and $w(b_j)=\Sigma_{i=1}^n b_{i,j}$. Also for any integers p, x, let $I \geq p(x)$ denote the indicator threshold function, defined as equal to 1 if $x \geq p$ and 0 otherwise. Then, for all integers p, q and monotone increasing functions g, h from N to [0, 1], define the utility function $$f_{p,q,g,h}(\{b_{i,j}\}_{i,j})=\Pi_{i=1}^m(I \geq_p(w(b_i)) \cdot g(w(b_i)))\Pi_{j=i}^n(I \geq_q(w(b_j)) \cdot h(w(b_j))), \text{ and}$$

refer to it as the threshold-based utility function.

In the following description the goal is designing an evolving access control algorithm that maximizes the threshold-based utility function. Ideally, this is clone independently of specific settings for p, q, g, h, for sake of greater generality. Note that if privacy requirements are ignored, the algorithm that always sets $b_{i,j}$=public for all i, j, trivially achieves this goal. This solution does not guarantee any relevant privacy properties.

Extending the intuition discussed in the case of user databases, next we formalize the fact that an evolving access control algorithm only sets all components of the sensitive vector as public with small probability, during a large number of time subintervals, and possibly during the entire time interval [0, T]. In other words, we even allow the adversary trying to violate privacy to collect vectors $b_i$ from the output of the evolving access control algorithm, for several, possibly all, values of i in $\{1, \ldots, m\}$. Even allowing this attack, using the present invention, the probability that this adversary can reconstruct the sensitive vector is small.

Formally, let $P \subseteq \{1, \ldots, n\}$ be an s-size sensitive subset, and let t be the number of time subintervals subject to the adversary's attack. For any $\epsilon>0$, the evolving access control algorithm EvAC satisfies (t, $\epsilon$)-privacy if for any $i_1, \ldots, i_t \in \{1, \ldots, m\}$, the probability that $V^{it}_{i=i1}(b_{i,j}=\text{public})$ is true for all $j \in P$ is at most $\epsilon$. The vector P is modeled as arbitrary and, for sake of greater generality, unknown to both U and S. (Even if U is theoretically in the best position to say which data is sensitive or not, we make the more practical observation that U may not make the best decision with respect to present or even future times, as often reported in news events.) Assume that the size s of P is known to the evolving access control algorithm. (Even if this may not be true in general, we note that our example construction really only needs to set s as an upper bound on |P|). Finally, model vector P as chosen independently by algorithm EvAC or its output. (One could certainly formally define an adaptive version of this definition, where P depends on the output returned by EvAC.)

In the following description the goal is designing an algorithm EvAC that simultaneously maximizes the t and minimizes the $\epsilon$ for which EvAC is (t, $\epsilon$)-private. If utility requirements are ignored, the algorithm that always sets $b_{i,j}$=private for all i; j, trivially achieves this goal. Thus, object of the invention is to achieve a tradeoffs of (t, $\epsilon$)-privacy and $f$-utility.

In following example a simple EvAC algorithm is based on a variant of a known class of almost cover-free families.

The main concept of the invention is to guarantee that the attribute of at least one of the data objects in the sensitive subset P remains set to private during as many as possible time subintervals, possibly during the entire time interval [0, T]. Towards achieving this goal, cover-free families seem a natural solution tool. Moreover, it is desirable to further achieve the following three goals, with respect to our privacy and utility parameters: maximize the time needed to carry out the attack to violate privacy, minimize the probability that all data objects are eventually set to public, and maximize an appropriate threshold-based utility function (as a function of the number of data objects set to public). The first goal suggests that the choice of cover-free subset is varied at each one of the m time subintervals of [0, T]. The second and third goals suggest that the choice of a family with good cover-freeness properties and with maximal size of the cover-free subsets, respectively. The definition of cover-free families follows.

Let n, m, k be positive integers, let G be a ground set of size n, and let $F=\{S_1, \ldots, S_k\}$ be a family of subsets of G. Then subset $S_j$ does not cover $S_i$ if it holds that $S_i \not\subset S_j$. Then family F is m-cover free over G if each subset in F is not covered by the union of any m other subsets in F.

Several results about cover-free families are known. For instance, it is known in Erdos, P., Frankl P. and Furedi Z, Families of finite sets in which no set is covered by the union of r others In Israeli Journal of Mathematics, 51: 79-89, 1985, that there exists a deterministic algorithm that, for any fixed m, l, constructs a m-cover free, k-size, family F of l-size vectors over a ground set of size n, for l=[n/4 m] and n≦16 $m^2(1+\log(k/2)/\log 3)$. In the present example, a black-box application of cover-free families would not solve the problem, for the following three reasons:

1. the subset to be covered (i.e., the sensitive subset) has size s, while the covering subsets (i.e., the set of attribute values for i=1, . . . , in) have size l, where, in general l≠s (as we attempt to maximize l);

2. the subset to be covered (i.e., the sensitive subset) can be any subset of $\{0, 1\}^n$, which, in general, may not be the case in cover-free sets; and 3. we admit a low, but positive probability that the sensitive subset is not covered, while this is not the case for an arbitrary cover-free family.

The third reason suggests that one might obtain constructions with better performance than using cover-free families. The first reason suggests that perhaps it is possible to use a variation of known cover-free families, and the second reason restricts the search among these. The example construction is a minor variant of a simple randomized construction, already used in many different contexts, that is (almost) a cover-free family, as noted in Garay, J., Staddon, J. and Wool, A. Long-live Broadcast Encryption. In Proc. of Crypto 2000, LNCS, Springer-Verlag.

The example of an evolving access control algorithm EvAC takes as input data objects $D_1, \ldots, D_n$ and the number m of time periods, and does the following.

First U's data objects $D_1, \ldots, D_n$ are randomly permuted. Intuitively, this guarantees that the distribution of the sensitive subset P is uniform over all s-size subsets from $\{0,1\}^n$. This fact further simplifies the utility and privacy analysis and helps improving the utility and privacy parameters.

Later, the algorithm computes the attribute values $b_{i,j}$, for i=1, . . . , m, and j=1, . . . , n, as follows. For each i∈{1, . . . , m}, a number l of distinct values $j_1, \ldots, j_l$ are uniformly and independently chosen from $\{0, 1\}^n$, and later $b_{i,j}$ is set equal to public for j=$j_1, \ldots, j_l$ or is set equal to private otherwise. Here, l is a parameter, depending on n, m, s, $\epsilon$, that is set (and maximized) in the analysis of the utility property of the scheme. In fact, it is not necessary to know the exact value of s: an upper bound of s would suffice.

Figure 2:
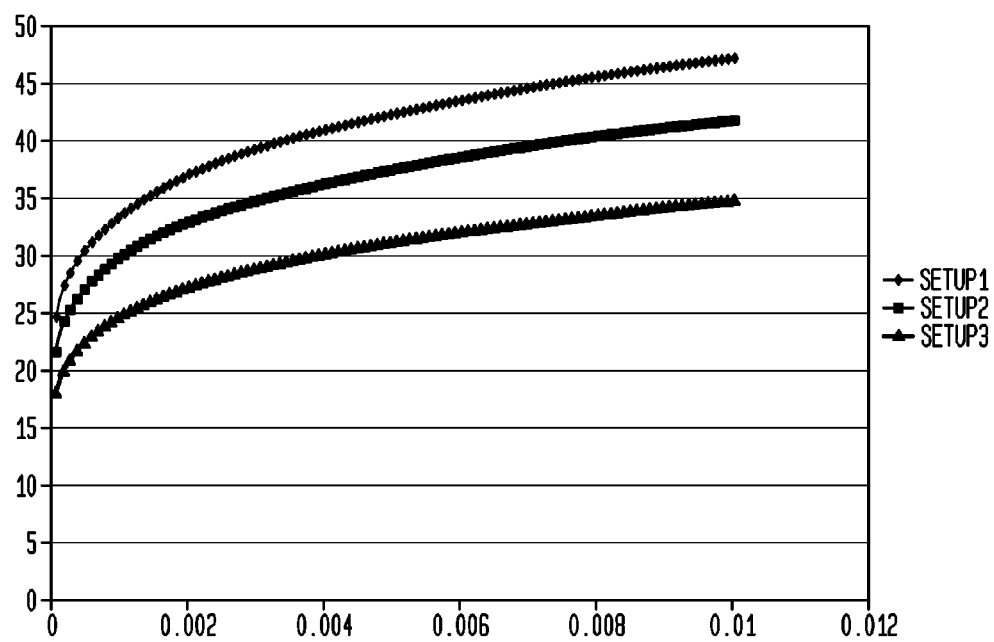
FIG. 2 is a graphical representation of the value of l as a function of $\epsilon$ when n=500, m=10, s=10 (setup 1), n=400, m=9, s=10 (setup 2), n=300, m=8, s=10 (setup 3). The min values of $\epsilon$ such that l>35 are 0.0014, 0.0032, and 0.0098, respectively.

Proof of the privacy and utility properties described above is illustrated by reference to FIG. 1 and FIG. 2 where FIG. 1 shows the values of $\epsilon$ as a function of l when n=500, t=m=10, s=10 (setup 1); n=400, t=m=9, s=10 (setup 2), n=300, t=m=8, s=10 (setup 3). The max values of l such that $\epsilon$<0.001 are 47, 41, and 35, respectively. FIG. 2 shows the value of l as a function of $\epsilon$ when n=500, m=10, s=10 (setup 1), n=400, m=9, s=10 (setup 2), n=300, m=8, s=10 (setup 3). The min values of $\epsilon$ such that l>35 are 0.0014, 0.0032, and 0.0098, respectively.

Theorem 1. Let U have a social network database with n data objects. Over m time periods, the above algorithm EvAC is an evolving access control algorithm that keeps at any given time ≦l document attributes set to public and satisfies (t, $\epsilon$)-privacy, for any t≦m, where $$\varepsilon = \left(1 - \left(1 - \frac{l}{n}\right)^t\right)^s$$

and s is (an upper bound on) the length of the sensitive subset. Whenever $\epsilon^{1/s} > 1-(1-2/n)^m$, algorithm EvAC satisfies g-utility, where g is the threshold-based utility function and is maximized by the largest value l such that $$l < n(1-(1-\epsilon^{1-s})^{1/m})$$

The contribution from this theorem, with respect to the privacy vs. utility tradeoffs, and on parameter settings is best explained as follows. Maximizing privacy alone can be obtained by an access control algorithm that sets $b_{i,j}$=private for all i, j, thus achieving (m, 0)-privacy, but minimal utility. Similarly, maximizing utility alone can be obtained by an access control algorithm that sets $b_{i,j}$=public for all i, j, thus achieving maximal utility for a large class of utility function (including the threshold-based utility function), but does not satisfy (1, $\epsilon$)-privacy, for any $\epsilon$<1. Instead, the algorithm EvAC achieves interesting privacy vs. utility tradeoffs where, for all t≦m, with respect to privacy, l limits the decrease of $\epsilon$, and, with respect to utility, $\epsilon$ limits the increase of l, the precise limitations being given in the theorem above.

The choice of parameter m, together with the duration of each time subinterval, should really depend on the type of social networking website. For instance, if a time period is set to be one month, the choice m=10 (that means: explicitly requiring a user to revisit his access control settings every 10 months) seems quite reasonable for some popular social networking websites.

The choice of the utility function should also depend on the specific social networking website. Thus, instead of defining a single utility function and show numerical results for it, we defined a sufficiently general class of utility functions and proved Theorem 1 assuming one of the functions in the class is used.

In practical events, s may be as small as 1 (e.g., one picture, one comment, one file). In general, a smaller s would force either a smaller choice of the utility parameter l for the same privacy parameters t, ϵ, or less desirable t, ϵ for the same l.

Figure 3:
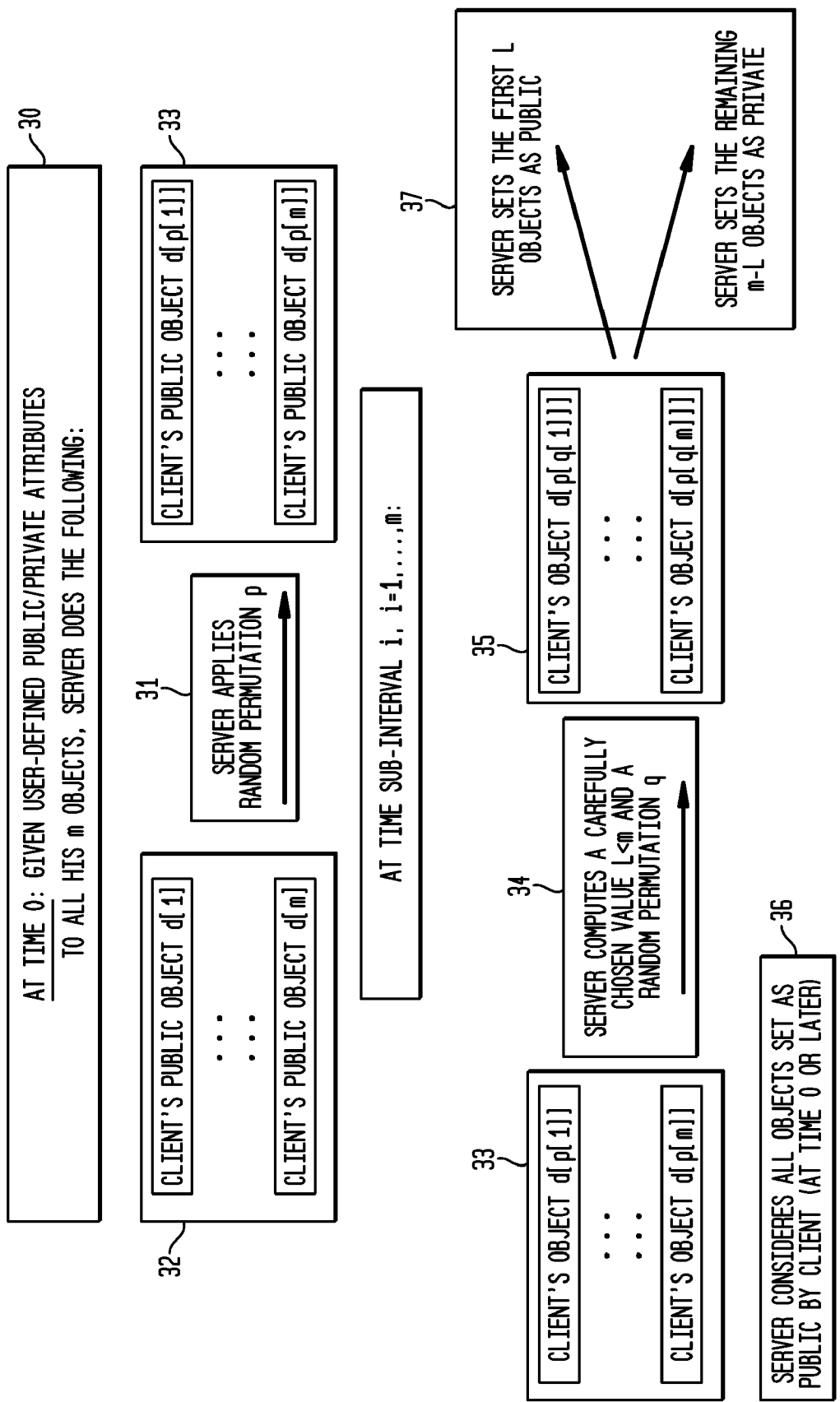
FIG. 3 is a modified flow chart of the invention.

Referring to FIG. 3, there is shown a flow diagram illustrating the invention. At time t=0 user-defined public/private attributes are applied to each of the user's m objects 30. The server applies random permutation p 31 to each public object d[1], ..., d[m] 32. The result are client public objects d[p[1]], ..., d[p[m]] 33. At a time sub-interval i, i=1, ... m, the server computes a carefully chosen value L<m and a random permutation q 34 resulting in client objects d[p[q[1]]], ..., d[p[q[m]]] 35 The server considers all objects set as public by client at time 0 or later 36. After applying the chosen value and random permutation the server sets the first L objects as public and the remaining m-L objects as private 37.

Figure 4:
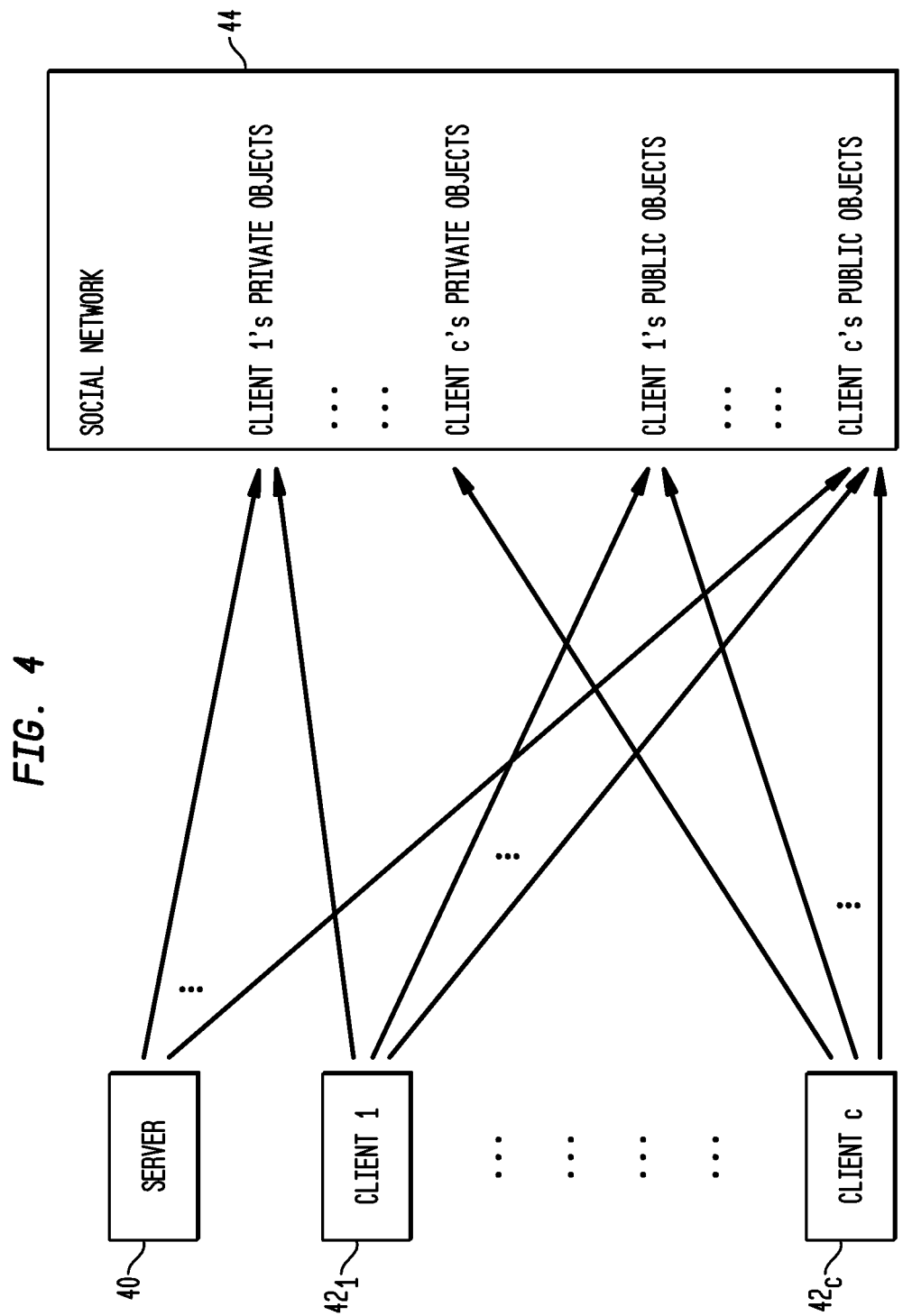
FIG. 4 is a simplified block diagram illustrating the invention.

FIG. 4 shows a block diagram of the above described invention. The server 40 can see all objects in the social network and resets the public/private attributes of each object. The clients $42_1, \ldots, 42_c$ can reset public/private attributes of its respective objects. The social network 44 contains private objects and public objects of each client. Only a client can see its private objects. Each client can see public objects.

Various aspects of the present disclosure may be embodied as a program, software, or computer instructions embodied in a computer or machine usable or readable medium, which causes the computer or machine to perform the steps of the method when executed on the computer, processor, and/or machine.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc. A module may be a component of a device, software, program, or system that implements some "functionality", which can be embodied as software, hardware, firmware, electronic circuitry, or etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server, and/or embedded system.

While there has been described and illustrated a method for limiting privacy loss due to data shared in a social network by means of evolving access control, it will be apparent to those skilled in the art that modifications and variations are possible without deviating from the principles and broad teachings of the present invention which shall be limited solely by the scope of the claims appended hereto.

What is claimed is:

1. A computer-implemented method of controlling privacy loss in a data sharing social network, the method comprising the steps of:
    providing the data sharing social network containing a plurality of user data objects for sharing the plurality of user data objects with a plurality of users according to an access control policy;
    dividing, by the computer, time into a sequence of time subintervals; and
    updating, by the computer, the access control policy at each time subinterval by randomly resetting some of the plurality of user data objects as public or private.

2. The computer-implemented method of claim 1, wherein the updating depends upon at least one past attribute setting.

3. The computer-implemented method of claim 1, wherein the plurality of user data objects are images.

4. The computer-implemented method of claim 1, wherein the plurality of user data objects are text.

5. The computer-implemented method of claim 1, wherein the plurality of user data objects are computer files.

6. The computer-implemented method of claim 1, wherein a sensitive subset of the plurality of user data objects is set to private during as many as possible of the time subintervals.

7. The method of claim 1, wherein the data sharing social network comprises a website.

8. The method of claim 1, wherein the updating the access control policy comprises updating the access control policy at each time subinterval by randomly resetting some of the plurality of user data objects associated with a given one of the plurality of users as public or private.

9. The method of claim 1, wherein the updating the access control policy is performed by use of a probabilistic algorithm.

10. A computer readable device having computer readable program code for operating on a computer for controlling privacy loss in a data sharing social network, the program code, when executing, causing the computer to perform steps comprising:
    providing the data sharing social network containing a plurality of user data objects for sharing the plurality of user data objects with a plurality of users according to an access control policy;
    dividing time into a sequence of time subintervals; and
    updating the access control policy at each time subinterval by randomly resetting some of the plurality of user data objects as public or private.

11. The computer readable device of claim 10, wherein the updating depends upon at least one past attribute setting.

12. The computer readable device of claim 10, wherein a sensitive subset of the plurality of data objects is set to private during as many as possible of the time subintervals.

13. The computer readable device of claim 10, wherein the data sharing social network comprises a website.

14. The computer readable device of claim 10, wherein the updating the access control policy comprises updating the access control policy at each time subinterval by randomly resetting some of the plurality of user data objects associated with a given one of the plurality of users as public or private.

15. The computer readable device of claim 10, wherein the updating the access control policy is performed by use of a probabilistic algorithm.

* * * * *

UNITED STATES PATENT AND TRADEMARK OFFICE
CERTIFICATE OF CORRECTION

PATENT NO. : 8,370,895 B2  
APPLICATION NO. : 12/855333  
DATED : February 5, 2013  
INVENTOR(S) : DiCrescenzo et al.

Page 1 of 1

It is certified that error appears in the above-identified patent and that said Letters Patent is hereby corrected as shown below:

In the Specification

In Column 3, Line 50, delete "$D_n \varepsilon \mathcal{D}$" and insert -- $D_n \in \mathcal{D},$ --, therefor.

In Column 3, Line 65, delete "bj; A(Dj)" and insert -- $b_j$; $A(D_j)$ --, therefor.

In Column 4, Line 5, delete "$D_n \varepsilon \mathcal{D}$" and insert -- $D_n \in \mathcal{D},$ --, therefor.

In Column 4, Line 33, delete "Also" and insert -- Also, --, therefor.

In Column 4, Line 44, delete "clone" and insert -- done --, therefor.

In Column 6, Line 50, after Equation, insert -- . --.

Signed and Sealed this  
Twenty-first Day of October, 2014

Michelle K. Lee  
*Deputy Director of the United States Patent and Trademark Office*